United States Patent [19]

Zurawski

[11] Patent Number: 5,097,436
[45] Date of Patent: Mar. 17, 1992

[54] HIGH PERFORMANCE ADDER USING CARRY PREDICTIONS

[75] Inventor: John H. Zurawski, Boxborough, Mass.

[73] Assignee: Digital Equipment Corporation, Maynard, Mass.

[21] Appl. No.: 462,731

[22] Filed: Jan. 9, 1990

[51] Int. Cl.⁵ .................. G06F 7/50; G06F 7/52
[52] U.S. Cl. ........................ 364/787; 364/766
[58] Field of Search .............. 364/787, 788, 766

[56] References Cited

U.S. PATENT DOCUMENTS

| | | | |
|---|---|---|---|
| 2,879,001 | 3/1959 | Weinberger et al. | 364/787 |
| 3,023,961 | 3/1962 | Stafford | 364/766 |
| 3,566,098 | 2/1971 | Kono | 364/787 |
| 3,700,875 | 10/1972 | Saenger et al. | 364/787 |
| 3,987,291 | 10/1976 | Gooding et al. | 364/787 |
| 4,084,254 | 4/1978 | Birney et al. | 364/766 |
| 4,380,051 | 4/1983 | Fette | 364/766 |
| 4,503,512 | 3/1985 | Doran | 364/761 |
| 4,525,797 | 6/1985 | Holden | 364/788 |
| 4,761,757 | 8/1988 | Sakai et al. | 364/761 |
| 4,761,760 | 8/1988 | Nukiyama | 364/788 |
| 4,858,168 | 8/1989 | Hwang | 364/787 |

OTHER PUBLICATIONS

"Pipelined Carry-Lookahead Adder for Fixed-Point Arithmetic", *IBM Tech. Disclosure Bulletin*, vol. 28, No. 9 Feb. 1986 pp. 4106-4108.

*Primary Examiner*—David H. Malzahn
*Attorney, Agent, or Firm*—Kenyon & Kenyon

[57] ABSTRACT

A high performance adder is provided including a predicted carry look ahead coupled between a lower order adder and a higher order adder of the high performance adder. The predicted carry look ahead provides as an input to the carry input of the adder a prediction of a carry bit produced by the adding of lower order bits of two addends by the lower order adder. By this arrangement, the highest order adder can operate on the highest order bits of two addends with a predicted carry and without having to wait for the results of the carries that occur in the lower order bits.

20 Claims, 10 Drawing Sheets

FIG. 3

| s | t | g | p |
|---|---|---|---|
| 0 | 0 | 0 | 0 |
| 0 | 1 | 0 | 1 |
| 1 | 0 | 0 | 1 |
| 1 | 1 | 1 | x |

$$\begin{array}{cccc} P_3 & P_2 & P_1 & P_0 \\ g_3 & g_2 & g_1 & g_0 \\ \hline 0 & 1 & 0 & 0 \} a_1 \\ 1 & 0 & 1 & 1 \} b_1 \end{array} \qquad \begin{array}{cccc} P_3 & P_2 & P_1 & P_0 \\ g_3 & g_2 & g_1 & g_0 \\ \hline 1 & 0 & 0 & 1 \} a_0 \\ 0 & 1 & 1 & 1 \} b_0 \end{array}$$

FIG. 4

HIGH PERFORMANCE ADDER USING CARRY PREDICTIONS

FIELD OF THE INVENTION

The invention relates to the field of addition and subtraction in digital computers. More specifically, the invention relates to a high-performance adder that uses carry prediction to add or subtract numbers in a digital computer.

BACKGROUND OF THE INVENTION

In the designing of a digital computer, a designer will determine the speed of operation of the computer (i.e. the cycle time). This determination of the cycle time is typically based on the speed of the adder that is used in the computer. Therefore, to satisfy the demand for higher speed (i.e. lower cycle time) computers, faster adders need to be provided.

The usual design of an adder, such as a 32-bit adder, is an adder that is partitioned into many smaller adders with carry-look-ahead logic. The lowest order adder will perform addition on, for example, the eight lowest order bits, the second lowest order adder will perform addition on the eight next lowest order bits, etc. Carry-look-ahead logic is used to generate carries from lower-order adder into the next higher-order adders. For example, the carry from the addition of the eight lowest order bits $<7:0>$ of the two numbers will be generated by the carry-look-ahead logic and provided to the next highest-order adder. The next highest order adder will then perform addition on bits $<15:8>$, adding in the carry from the carry-look-ahead logic.

When a relatively large adder is used, such as a 32-bit adder, there are problems associated with the carry-look-ahead method. One problem is that the "critical timing path" is through the carry-look-ahead logic so that the adder is limited by how fast a carry can be generated in a lowest-order bit and propagated through the carry-look-ahead logic to the highest-order bit for which there can be a carry. As an example, if four 8-bit adders are used to make up a 32-bit adder, a carry that is generated in the first lowest-order bit can be propagated up to the 24th bit. This carry from the 24th bit will be provided to the highest-order 8-bit adder, which will operate on bits $<31:24>$. The propagation of a carry through 24 bits takes a relatively long time and requires a relatively cumbersome design.

The logic used in the carry-look-ahead logic is known as propagate and generate logic. In the example of a 32-bit adder, the carry for the 24th bit will be determined by seven terms, using this generate and propagate logic. (This will be described in more detail later). The use of seven terms to determine a carry bit necessitates the use of relatively large gates (e.g. gates with seven inputs). The larger gates are slower than smaller gates, and may not even be allowed by the manufacturing technology. Furthermore, the wire delay with the use of standard carry-look-ahead logic is relatively long, since the logic has to span the full width of the adder.

There is a need for a high-performance adder that has improved speed, without using carry-look-ahead logic such as that which has generally been used.

SUMMARY OF THE INVENTION

The present invention provides a high performance adder that avoids the use of a standard carry-look-ahead logic circuit with its attendant problems. The invention does this by providing a predicted carry look ahead between a lower-order adder and a higher-order adder. The predicted carry-look-ahead will "look back" at a certain number of bits, such as 8, in the lower-order adder. From these bits, the predicted carry-look-ahead will provide a predicted carry to the next highest-order adder so that it can perform an addition or subtraction. When the high performance adder is a 32-bit adder comprising four 8-bit ("byte") adders, three predicted carry-look-aheads are provided, one between each of the byte adders. By this arrangement, the highest-order byte adder, operating on bits $<31:24>$, can operate on the highest-order bits with a predicted carry, and does not have to wait for the results of the carries that occur in the lower-order bits.

The predicted carry-look-ahead takes advantage of the fact that only a certain number of lower-order bits will have a significant probability of affecting a carry for a higher-order adder. For example, if a predicted carry-look-ahead is using the bits $<23:16>$ to predict the carry into the adder for bits $<31:24>$, the effect of bits $<15:0>$ will be very small. In fact, the lower-order bits $<15:0>$ will cause a mis-prediction of the carry bit into the adder for bits $<31\ 24>$ only approximately 0.6% of the time. In other words, the carry can be accurately predicted using only bits $<23:16>$ approximately 99.4% of the time.

On those occasions when a carry is mis-predicted, the correction of the sum is easily performed according to the present invention. The correction method used will depend on the method of truncation used to form the prediction. One method of correction is to add a binary number, with the inverse of the mis-predicted carry in the appropriate bit position For example, if there is a mis-prediction of the carry into bit $<24>$, then a binary number with zeros in each of the bit positions and a 1 in bit position 24 will be added to the sum generated with the mis-predicted carry. This will produce the correct sum.

Alternatively, a mis-prediction can be rectified by merely re-performing the addition, except this time with the correct predicted carry bit. This will also produce the correct sum.

The high-performance adder is used as a component in a divider according to the present invention. The divider operates as a non-restoring divider with a re-storing step that occurs whenever a predicted carry does not match the true carry out of the lower-order adder. In other words, the divisor is repeatedly subtracted or added with the partial remainder in accordance with the usual rules of the non-restoring algorithm. As long as the predicted carry matches the true carry the partial remainder generated each cycle will be correct. However, when the predicted carry mis-matches the true carry then the partial remainder generated will be incorrect. At that point, the division step is repeated exactly as before except that now the predicted carry is corrected and used instead. This replaying step will ensure that the partial remainder is accurate.

BRIEF DESCRIPTION OF THE DRAWINGS

FIG. 3 is a truth table for generate and propagate logic.

FIG. 4 shows an example of two 8-bit numbers, and the grouping of the eight bits into nibbles for purposes of the generate and propagate logic.

DETAILED DESCRIPTION

Figure 1:
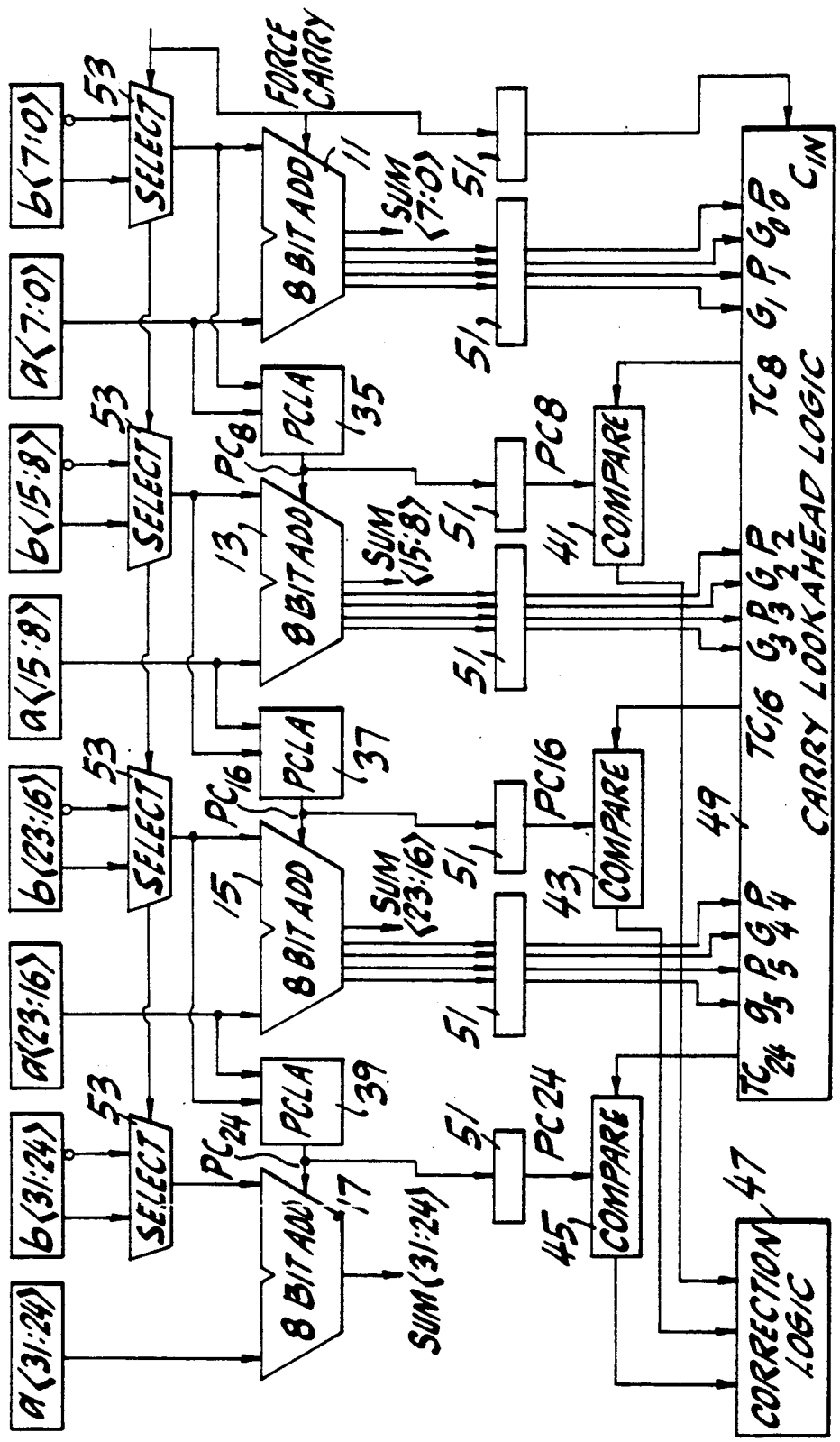
FIG. 1 is a block diagram of a high-performance adder constructed in accordance with an embodiment of the present invention.

FIG. 1 illustrates a high performance adder constructed in accordance with an embodiment of the present invention. This adder is shown as a 32-bit adder, comprising four 8-bit (hereinafter "byte") adders 11,13,15 and 17. Although not explicitly shown in FIG. 1, each byte adder 11,13,15,17 can have two 4-bit (hereinafter "nibble") adders.

The 32-bit adder in FIG. 1 adds (or subtracts) two 32-bit numbers $a<31:0>$ and $b<31:0>$. Each of the byte adders 11-17 will add one byte (8 bits) of the two addends $a<31:0>$ and $b<31:0>$. In other words, the lowest order byte adder 11 will add the byte $a<7:0>$ and $b<7:0>$, the two lowest-order bytes of the two addends. Further, select logic 53 will select NOT b to be the input when a subtraction is desired instead of an addition. ($a-b=a+NOT\ b+1$ in binary arithmetic)

In the illustrated embodiment, the a and b inputs to the byte adders 11,13,15 are separately provided to a predicted carry-look-ahead (PCLA) 35,37,39. However, the byte adders can also have generate and propagate logic with them that is shared with a PCLA 35,37,39. From these inputs, each PCLA 35,37,39 provides a predicted carry to the next highest-order byte adder. For example, inputs $a<15:8>$, $b<15:8>$ are provided to PCLA 37. Using the logic contained in the PCLA 37, a predicted carry (PC) for bit 16 is generated. This predicted carry $PC_{16}$ is provided to the carry input of byte adder 15. The byte adder 15 uses the predicted carry $PC_{16}$ in its addition of bytes $a<23:16>$ and $b<23:16>$.

The predicted carry is also sent from each PCLA 35,37,39 to one of three compare units 41,43,45. Each of these compare units 41,43,45 compares the predicted carry with the actual, or true carry generated by carry look ahead logic (CLA) 49. The CLA 49 is a conventional CLA and therefore the results of the CLA 49, i.e. the true carries TC8, TC16 and TC24 will not be available as quickly as the corresponding predicted carries PC8, PC16, PC24. A level of registers 51 allows the add of $a<31:0>$ and $b<31:0>$ to complete, using the predicted carries, with the comparison of the true carries to the predicted carries being performed a cycle later. Thus, a pipelining effect is created, so that a second add using a predicted carry is performed at the same time that the predicted carries for the first add are being checked.

The compare unit 43 will compare the $PC_{16}$ generated by the PCLA 37 with the true carry ($TC_{16}$) generated by the CLA 49 in the addition of $a<15:8>$ and $b<15:8>$. If the comparisons match, the compare unit 43 does nothing, since the predicted carry $PC_{16}$ used by the byte adder 15 is correct. However, when the comparison shows that the predicted carry used by the byte adder 15 is incorrect, the compare unit 43 will send out a signal to correction logic 47.

When the correction logic 47 receives a signal from one of the compare units 41,43,45 indicating a mis-prediction, the add is simply redone, with the mis-predicted carry bit being inverted. In other words, if $PC_{16}$ was mis-predicted as a zero, when it should have been a one, the addition is simply redone with a 1 as the predicted carry $PC_{16}$. This is because the prediction is always at or lower than the true value in this embodiment due to discarding of terms. This is easily performed in the logic of the PCLA's 35,37,39. Alternatively, when there is a mis-prediction, the sum can be corrected by simply adding a 1 to the sum in the appropriate bit position. By either of these two methods the sum of a and 1, will be corrected. As stated earlier, other methods of truncation to form a prediction will possibly necessitate the use of other correction methods.

By providing a predicted carry-look-ahead that looks back at the last eight bits of each of the byte adders, the present invention provides a significant speed advantage over conventional carry-look-aheads. This is due to the fact that adders using only conventional carry-look-aheads must wait for the results of a lower order carry-look-ahead before performing the carry-look-ahead in higher orders. Therefore, a critical timing path is through the carry look-ahead. Furthermore, the carry-look-ahead is implemented using a relatively large amount of etch, and large gates with seven inputs or more are needed to implement the carry-look-ahead logic. These larger gates are slower than smaller gates.

Figure 8:
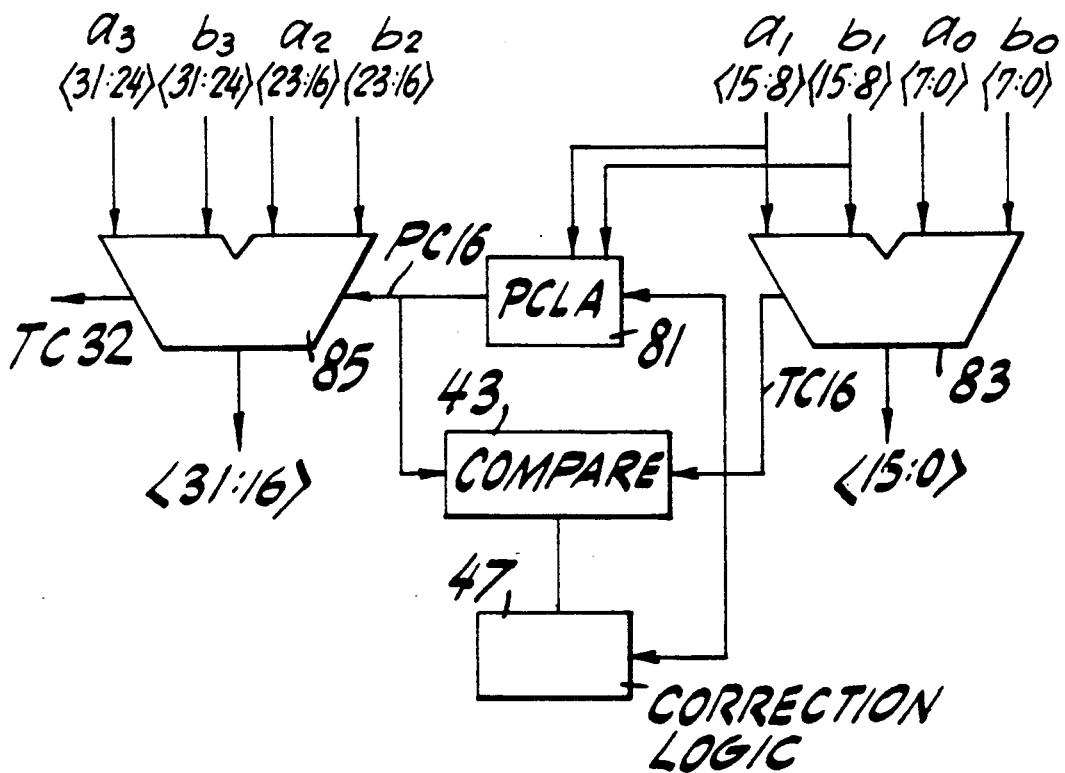
FIG. 8 illustrates the adder arrangement of another embodiment of the high performance adder of the present invention.

The present invention is not limited to 32-bit adders that use byte adders. For example, referring to FIG. 8, a 32-bit adder can be implemented using two 16-bit adders. In this embodiment, the PCLA 81 does not look back at all 16 bits of the lower order adder 83, but only needs to look back at 8 bits of the lower order adder in order to provide the predicted carry $PC_{16}$ to the higher order adder 85. Looking back at these eight bits of the 16 bit adder provides a very accurate prediction of the carry of the lower order adder 83 into the higher order adder 85.

Generalizing from this embodiment, and the earlier described embodiment with byte adders, it can be seen that to perform addition on two m-bit numbers, the m-bit numbers are operated on by n-bit adders of higher and lower orders. Of the n-bits in a lower order adder, only q bits are used to predict the carry for the higher order adder. In the embodiment which uses two 16-bit adders, m is 32, n is 16 and q is 8. In the embodiment which uses four byte adders, m is 32, n is 8 and q is 8. It is only needed to look back at as many bits as necessary to provide a desired frequency of accurate predictions. Further, the m-bit numbers do not have to be partitioned into lower and higher orders of equal bit length. For example, with a 32-bit number, the lower order adder can be j bits while the higher order adder operates on k bits, where j is 19 and k is 13.

Figure 1A:
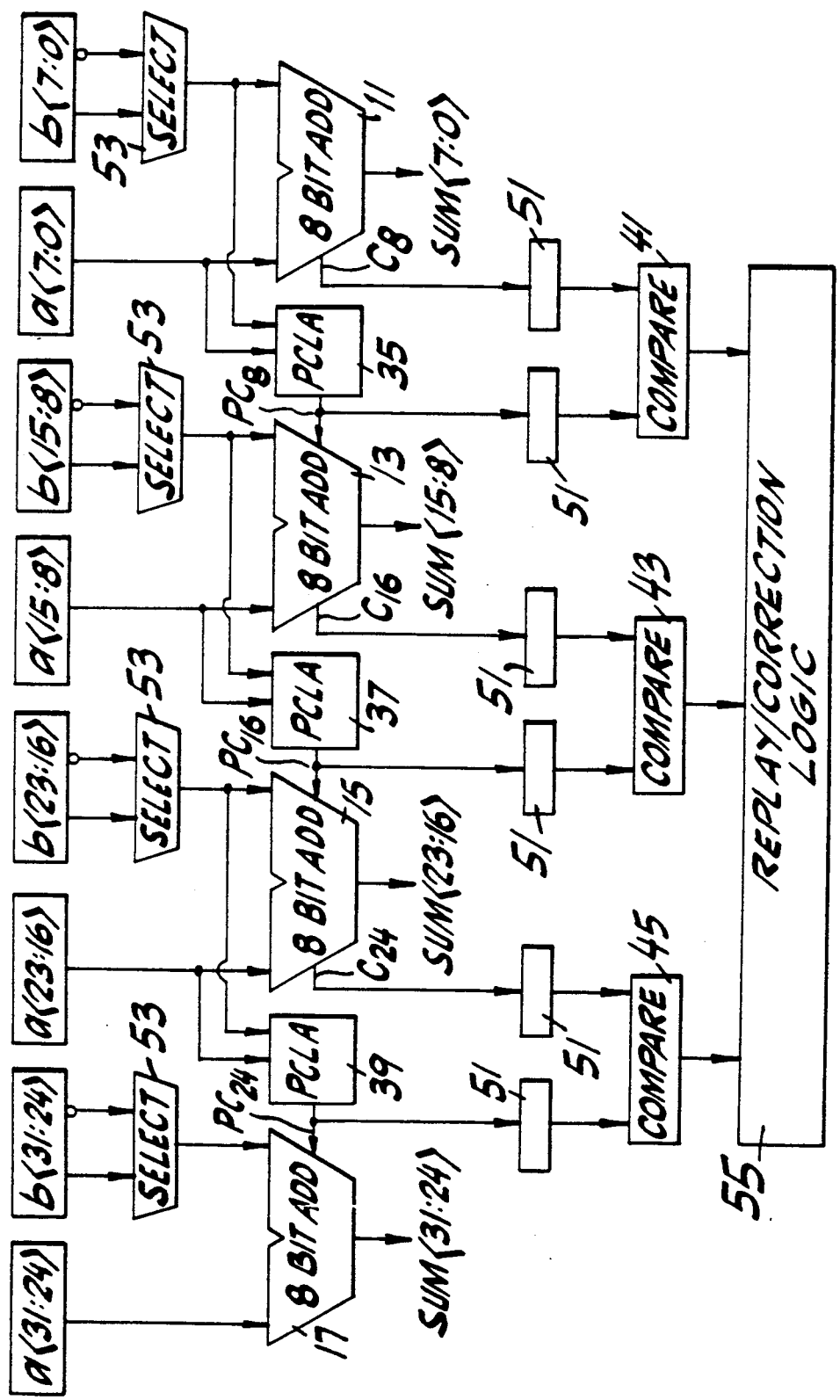
FIG. 1A is a block diagram of a high-performance adder constructed in accordance with another embodiment of the present invention.

Another embodiment of the present invention is shown in FIG. 1A, in which the use of the conventional carry look ahead logic (CLA) 49 is completely avoided. In this embodiment, the predicted carry is compared with the carry generated by a single adder. For example, $PC_{24}$, produced by PCLA 39, will be compared with $C_{24}$ that is produced by the addition of bits a<23:16> and b<23:16> and $PC_{16}$ in the byte adder 15. The carry from the byte adder 15, $C_{24}$, is not the true carry for all the bits <23:0>. Instead, it is merely the carry for the bits that are added in the byte adder 15, in this case bits <23:16>.

Since the carry $C_8, C_{16}$ or $C_{24}$ is based only upon the eight bits sent to that particular byte adder, the carry may be incorrect. Therefore, the comparison between the PC and the C can also be incorrect. However, any error in the PC or the C will be corrected in a "ripple" manner. An example of this ripple correction follows.

Assume, for example, that $C_8=1$ and $PC_8=0$. This means that the addition in byte adder 11 of bits <7:0> produces a carry. Since $PC_8$ does not equal $C_8$, there will be a miscomparison, and the compare unit 41 will send a signal to replay/correction logic 55. The replay/correction logic 55 causes another addition by adding in a correcting vector (CV) to the incorrect sum, and will ignore the mis-compare on $PC_8$ during this correction cycle. The correcting vector will essentially be all zeros with a one bit set in the proper position. For example, if $C_8$ should properly be a 1, a CV with the bit <8> set will be added to the incorrect sum.

After the CV has been added to the incorrect sum, it is now possible for there to be a miscomparison of $C_{16}$ and $PC_{16}$ since the second byte adder 13 now has the correct results (i.e. the correct value of the carry bit) from the addition of the lowest order 8 bits. The addition of the first CV to the incorrect sum will produce an accurate value of $C_{16}$. This value of $C_{16}$ is compared with the value of $PC_{16}$. Again, if there is a miscomparison, a second CV is added to the incorrect sum, this time with the 1 bit being set in bit number 16. Again, during this correction cycle the mis-compare of $PC_{16}$ is ignored.

The same procedure is followed if there is a miscomparison of $C_{24}$ and $PC_{24}$ after the addition of a second CV to the incorrect sum. Thus, if there is a third miscomparison, a third CV is added to the incorrect sum. This will finally produce the correct result.

The above procedure is a worse-case example in which there are three miscompared carries which occurs only very infrequently in normal computation. Therefore, the penalty of three miscompares is negligible. Furthermore, examples having two miscompares in a row are also infrequent.

The PCLA's 35, 37, and 39 of the present invention use what is known as propagate "P" and generate "G" logic in order to provide a predicted carry. Propagate and generate logic is well known. The term "propagate" indicates that the two bits in a certain bit position such as bit position <3> will propagate or not propagate a carry from the next lowest order bit, in this case from bit position <2>. The term "generate" is simply an indication of whether the bits in a certain bit position, such as in bit position 3, will generate a carry when the two numbers are added together.

A truth table for generates and propagates is illustrated in FIG. 3 for the two bits s and t. From this truth table, it can be seen that a generate will be true (i.e., a carry will be generated) only when both bits s and t are one. The truth table also shows that a carry will be propagated (i.e., be equal to one) only when one of the bits s or t is a 1. From this truth table, it should be apparent that the generate function can be represented by the AND function while the propagate function can be represented by the OR function.

Bits can be grouped together to provide a combined G and P. This is illustrated in FIG. 4 in which two sets of two nibbles are shown. Each set of two nibbles is one byte (eight bits) of one of the two numbers to be added together. The addition of the nibbles is performed separately from the predicting of the carry bit for the nibbles. The first nibbles $a_0$ and $b_0$ are grouped together to produce the signals $G_0$ and $P_0$. The second nibble, made up of $a_1$ and $b_1$, produces the signals $G_1$ and $P_1$.

For a single nibble, the equation for $G_0$ is: $G_0 = g_3 + g_2 \cdot p_3 + g_1 \cdot p_3 \cdot p_2 + g_0 \cdot p_3 \cdot p_2 \cdot p_1$. The equation for $P_0$ is: $P_0 = p_0 \cdot p_1 \cdot g_2 \cdot p_3$. (Note that the term "+" indicates an OR function while the term "." indicates the AND function.) These equations are valid for every nibble. For a single nibble, a carry will be generated only when $G_0 = 1$ or if $P_0 = 1$ and there is a carry into the nibble.

The G and P logic can be understood using FIG. 4 and with the following explanation. A carry will be produced from the first nibble, bits <3:0>, when $G_0 = 1$ according to the formula given above. This will happen if one of five situations is true. The first situation occurs when there is a 1 in both of the bits in position 3, i.e., $g_3 = 1$. There is thus a "generation" of a carry from the addition of the 1's in bit position 3, so that the nibble <3:0> has produced a carry. In this situation, $g_3 = 1$, so $G_0 = 1$ and the carry = 1. A carry can also be produced in a second situation, where both $g_2$ and $p_3$ are = 1. In common language, this means that the addition of bits in bit position 2 has generated a carry (i.e., are both 1's). This carry must then be "propagated" by the next bit position, this time bit position 3. If both bits in bit position 3 are zero, then the carry from bit position 2 will not be propagated out of the nibble so that this term $g_2 \cdot p_3 = 0$ and will not produce a carry from the nibble.

Similar reasoning applies for the remaining terms, $g_1 \cdot p_3 \cdot p_2$ and $g_0 \cdot p_3 \cdot p_2 \cdot p_1$. A carry will be produced by a term if a lower order bit generates a carry which is then propagated by all of the higher order bits. If any one of the higher order bits contains two zeros, then the carry will not be propagated out of the nibble.

The P term—the propagate term—relates to whether all of the bit positions of a nibble will propagate a carry that is input to the nibble from a lower order adder. Again, none of these bit positions can contain two zeros, or the carry from the lower order adder will not be propagated out of the nibble.

The P and G logic is combinable so that a carry from a large sequence of bits can be determined by combining the P's and G's from portions of the large sequence. Examples of this are given below.

For the lowest order byte (bits <7:0>), the carry or "carry-look-ahead" is determined from the following formula $CLA_8 = G_1 + P_1 \cdot G_0 + P_1 \cdot P_0 \cdot C_{in}$. Using the truth table of FIG. 3, and the example shown in FIG. 4, it can be seen that a carry will be produced from the first nibble since both $F_0 = 1$ and $P_1 = 1$. This carry is generated in the lowest order bit and is propagated through the higher order bits.

To assure a completely accurate carry for bit 16, the carry-look-ahead circuit of the prior art must look back at the previous 16 bits (or 2 bytes). The carry-look-ahead of the prior art accounts for any carry produced in the eight lowest order bits. Therefore, the carry-look-ahead would be determined according to the equation:
$CLA_{16} = G_3 + P_3.G_2 + P_3.P_2.G_1 + P_3.P_2.P_1.G_0 + P_3.P_2.P_1.P_0.C_{in}$.

Finally, the carry-look-ahead for bit 24 would be determined by the prior art according to the equation:
$CLA_{24} = G_5 + P_5.G_4 + P_5.P_4.G_3 + P_5.P_4.P_3.G_2 + P_5.P_4.P_3.P_2.G_1 + P_5.P_4.P_3.P_2.P_1.G_0 + P_5.P_4.P_3.P_2.P_1.P_0.C_{in}$.

Figure 2:
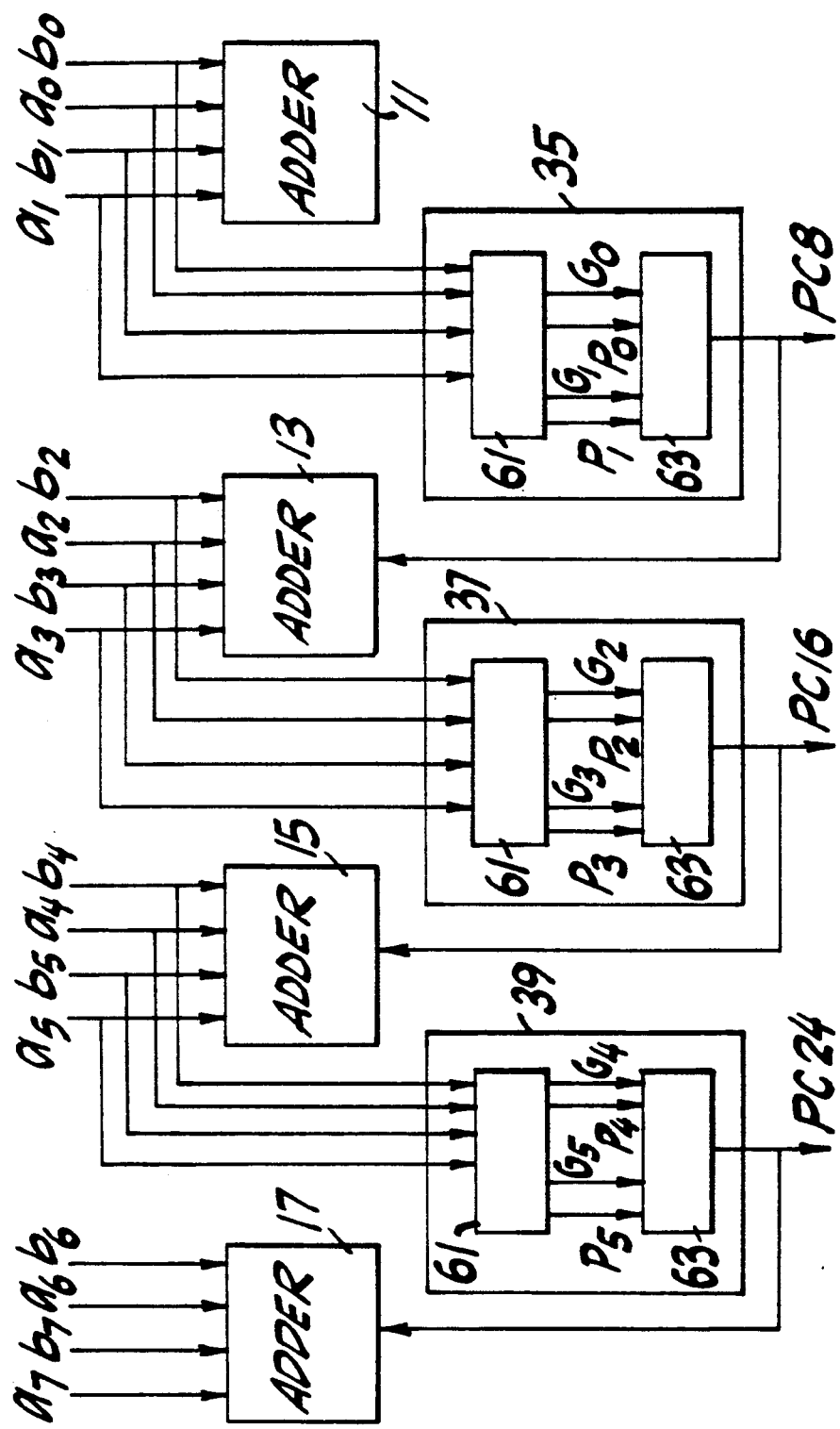
FIG. 2 illustrates a portion of the high-performance adder of FIG. 1, with a block diagram of the predicted carry-look-ahead used in the high-performance adder of FIG. 1.

FIG. 2 shows schematically the PCLA's 35,37,39 coupled to the inputs to the adders 11,13,15. Each PCLA 35,37,39 contains a first level of logic 61 that produces the P and G logic for two nibbles. The second level of logic 63 combines the two sets of P and G signals provided by the first level of logic 61.

Looking at the equation for $CLA_{24}$, it can be seen that there are seven terms that need to be used to provide a completely accurate "true carry" for bit 24. However, the present invention achieves a high degree of accuracy by predicting the carry for bit 24 using only a few of the terms in the equation for $CLA_{24}$. In other words, the equation is truncated to its most significant terms. Thus, the predicted carry ($PC_{24}$) is represented by the equation: $PC_{24} = G_5 + P_5.G_4$. Therefore, the predicted carry, $PC_{24}$, is missing the terms $P_5.P_4.G_3 + P_5.P_4.P_3.G_2 +$ etc.

The chance of any P being a 1 is one in $2^4$ (i.e., $P_0 = p_3.p_2.p_1.p_0$ with all of the p's being set happening once out of 16 possibilities). The chance of a generate G being a 1 is one-half. This analysis provides that the term $P_5.P_4.G_3$ will be equal to 1 once in $2^9$ times. The next term in the equation, $P_2.P_4.P_3.G_2$, has only a one in $2^{17}$ chance of producing a 1 and is therefore considered to be insignificant, as are the remaining terms in the equation for $CLA_{24}$. The guess for $CLA_{24}$ (i.e., $PC_{24}$) will therefore be wrong approximately 1 in $2^9$ times = approximately 0.2%. If the same logic is used for $CLA_{16}$ and $CLA_8$, the sum of the 32-bit sum being wrong is approximately 0.6% of the time. To put it another way, using the predicted carry method of the present invention, the sum will be correct approximately 99.4% of the time.

Figure 5:
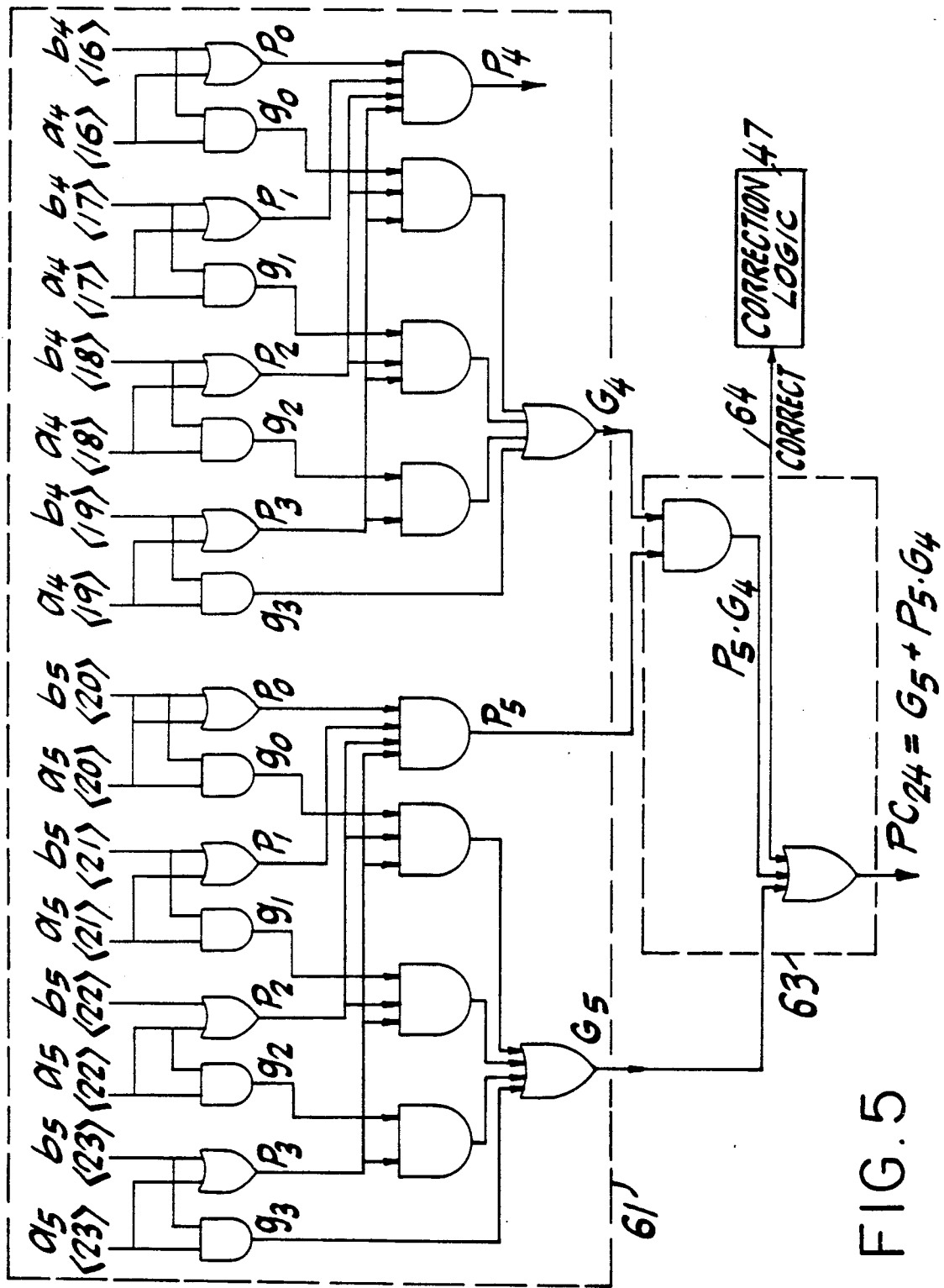
FIG. 5 shows an example of the logic gates that can be used to implement the predicted carry-look-ahead logic of FIG. 2.

An example of a PCLA is shown in FIG. 5, which illustrates the logic used in PCLA 39 that calculates the predicted carry $PC_{24}$. The first level of logic 61 produces P4 and G4 for nibbles a4,b4, and P5,G5 for nibbles a5,b5. The second level 63 contains an AND gate and an OR gate to provide the function $G_5 + P_5.G_4$, this function being the approximation of $CLA_{24}$. The approximation of $CLA_{24}$ is equal to $PC_{24}$, the predicted carry that is provided to the next higher order byte adder 17. Similar logic is used in the other PCLA's 35,37.

Note that a "correct" line 64, connected to the correction logic 47, is coupled to the final OR gate in logic level 62. A signal on this line forces $PC_{24}$ to be a 1 when there is a mis-prediction. (Since the prediction discards terms, a prediction can be wrong only if a zero is predicted and it should have been a one.) Thus, when the correction logic 47 receives a signal from a compare unit, it sends a signal on the correct line 64 when the addition is being redone so that the predicted carry will be set to a one. In another embodiment, in which another number is added to correct the sum, the correct line 64 is not needed.

Figure 7:
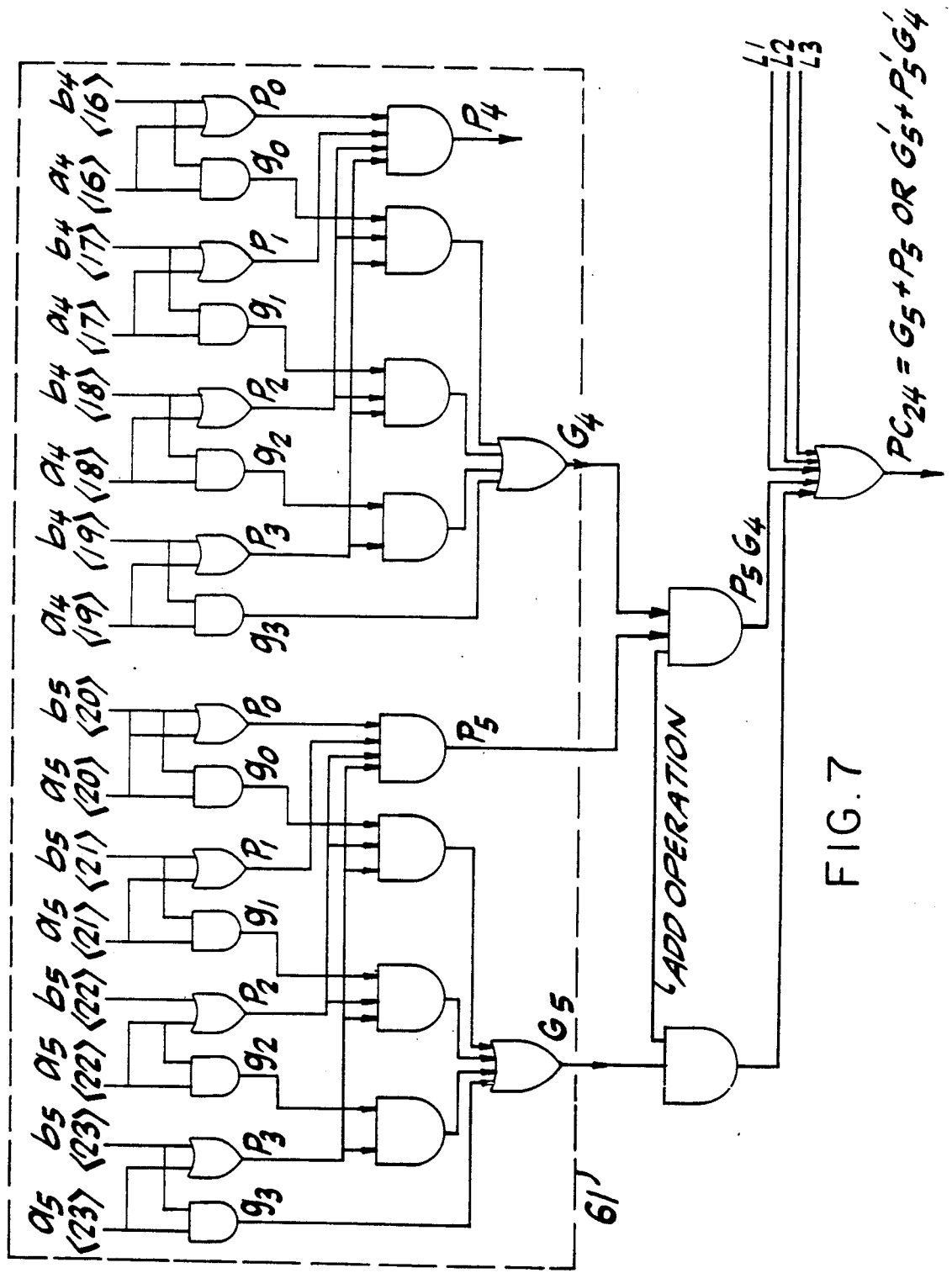
FIG. 7 shows an example of the logic gates that can be used to implement the predicted carry-look-ahead logic with a parallel subtracting path.
Figure 7:
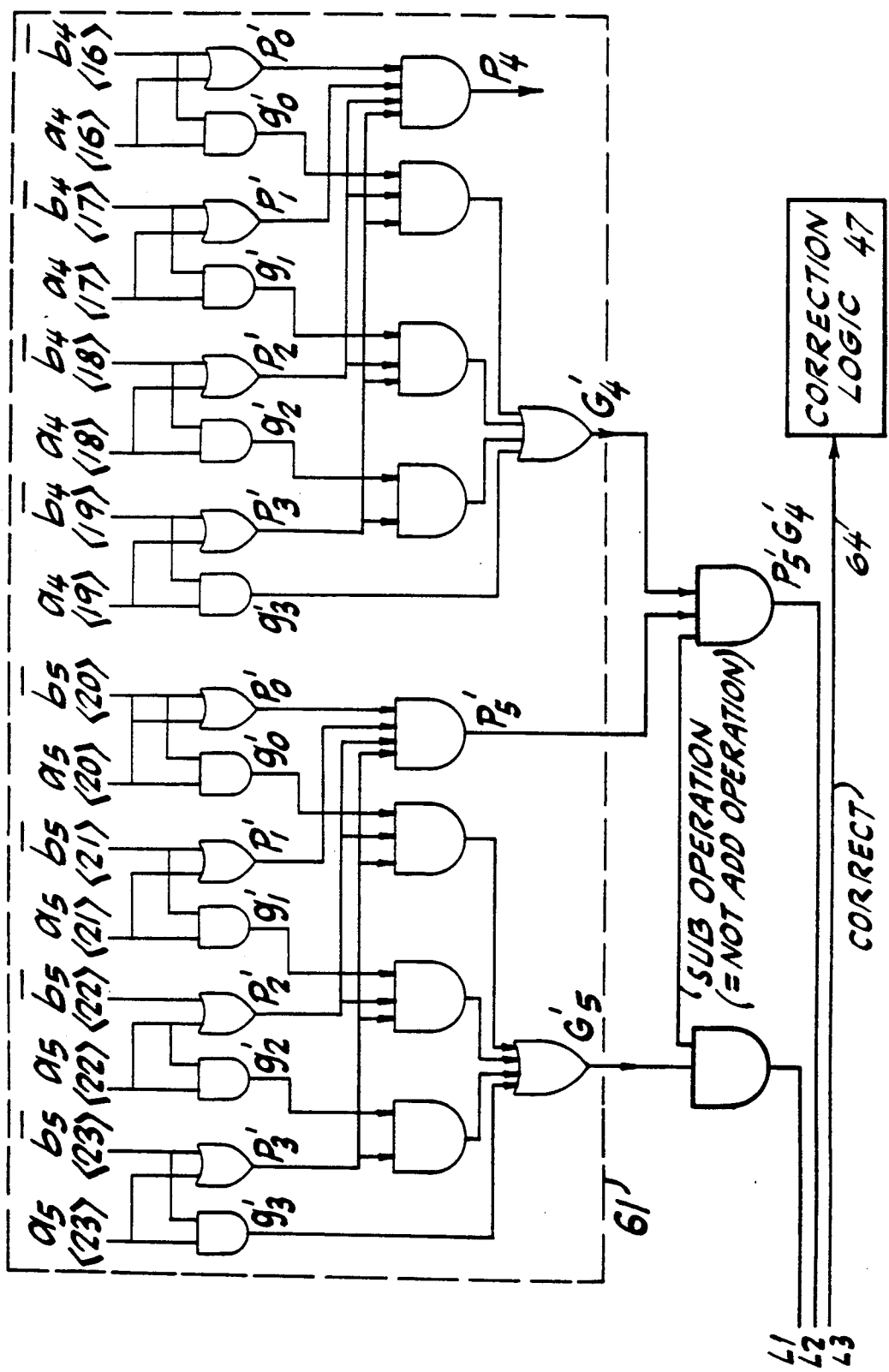

FIG. 7 shows an embodiment of the present invention which provides a fast means of subtraction. The embodiment shown in FIG. 7 comprises two PCLA's in parallel, similar to the embodiment of the PCLA shown in FIG. 5. The PCLA on the left hand side of FIG. 7 is the same as that in FIG. 5, while the PCLA on the right hand side of FIG. 7 replaces the b input with NOT b. An add signal is provided to enable the PCLA on the left hand side of FIG. 7, and a subtract signal is provided to enable the PCLA on the right hand side of FIG. 7. The signals from the right PCLA in FIG. 7 will therefore produce the predicted carry for a subtraction, while that for the left PCLA will produce the predicted carry for an addition.

The embodiment of FIG. 7 does not add any layers of logic, but rather expands the logic horizontally so that addition and subtraction are performed in parallel, and provides a significant speed advantage over conventional carry look ahead logic. With a conventional CLA, three additional levels of logical gates are needed in order to provide a subtraction capability. The three additional levels make an adder using only the carry look ahead of the prior art slower than an adder which uses the PCLA of the present invention.

The replication of logic to provide both add and subtract paths in the PCLA is allowed by the relatively small number of terms used to calculate the PC, such as $PC_{24}$. In the example of FIG. 7, only four terms are used to provide the predicted carry $PC_{24}$. By contrast, with a conventional CLA, the true carry $TC_{24}$ would require eight or more terms, and therefore eight inputs to the final OR gate which produces $TC_{24}$. Therefore, the replication of logic to provide parallel add and subtract paths as in the present invention is not feasible for the conventional CLA.

Figure 6:
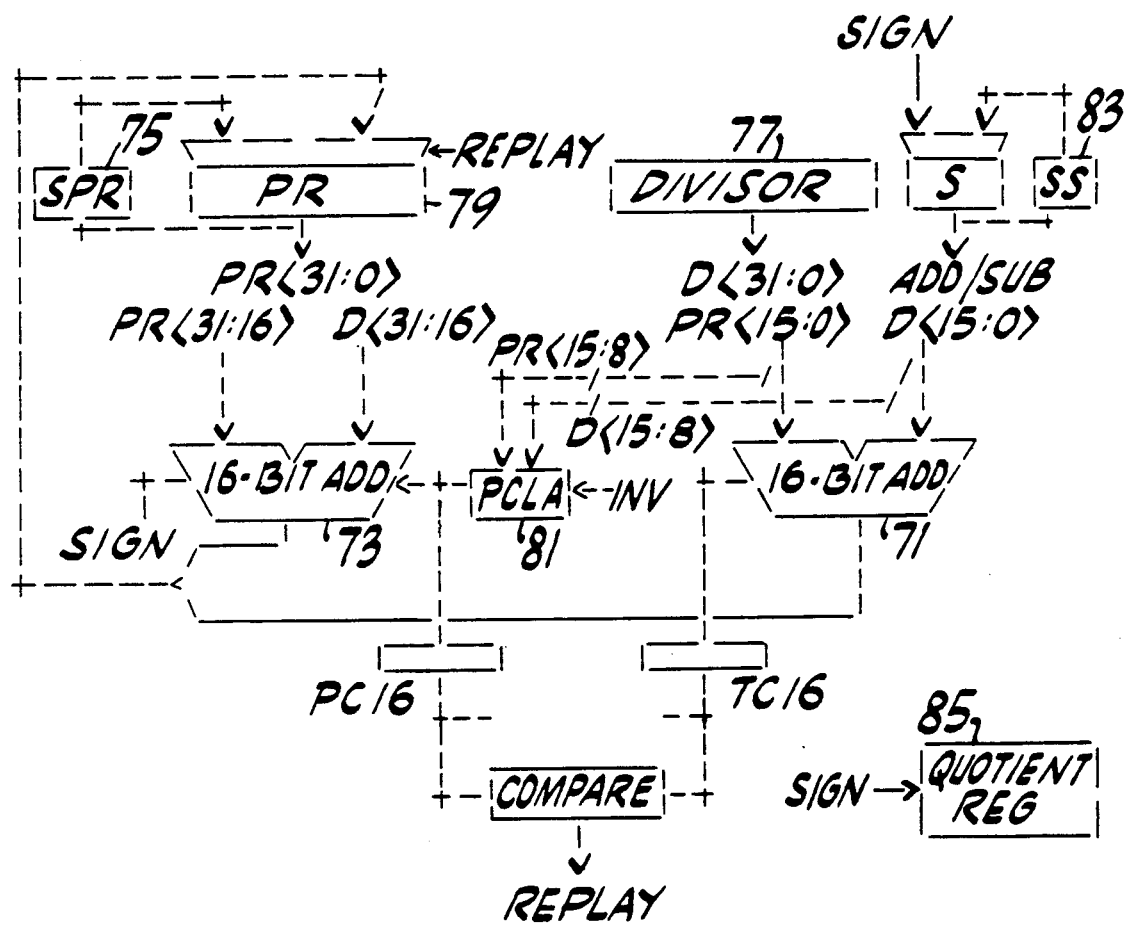
FIG. 6 illustrates a high-performance divider according to an embodiment of the present invention that uses a high-performance adder having predicted carry-look-ahead.

The adder of the present invention, using the predicted carry technique, finds useful application in the implementation of a fast divider. Such a divider is shown in FIG. 6. For the sake of simplicity, only two 16-bit adders 71,73 are shown, with an 8-bit look-back for the carry prediction. Although an embodiment with only two 16-bit adders are shown, the divider in FIG. 6 can also be implemented using the embodiment of the adder shown in FIG. 1. Before explaining the specific divider, binary division in computers in general will be discussed.

Figure 9:
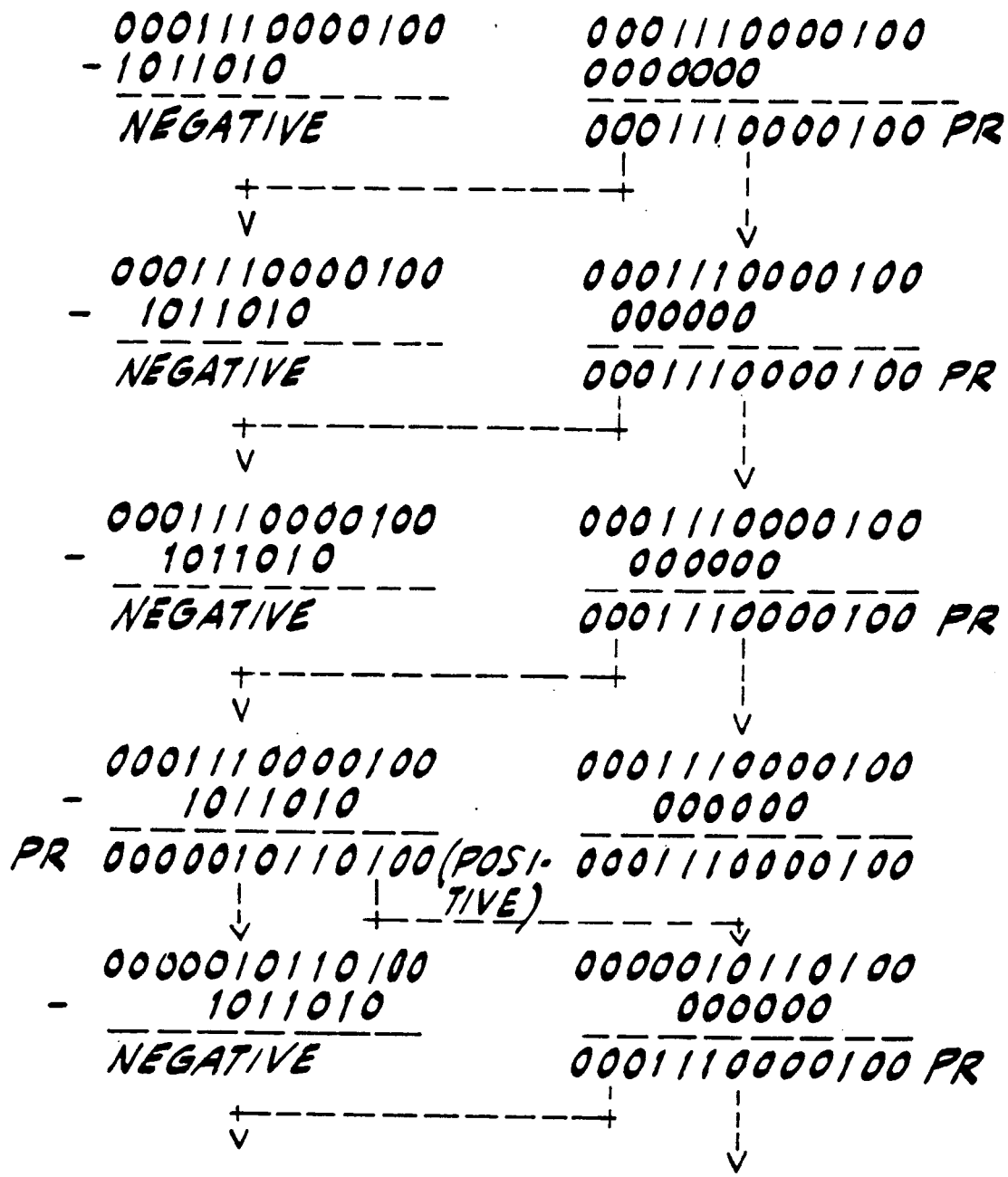
FIG. 9 illustrates an example of a binary division flow.

Basically, division is a series of trial subtractions of a shifted divisor from a dividend and partial results. This is shown in FIG. 9 where there are two columns showing two possible options (subtract the divisor or do nothing) and where the next partial result is chosen based upon the result of the subtraction. If the result is negative, the partial result PR is restored, the divisor is shifted by one bit, and another subtraction is tried. Whenever there is a positive result of the subtraction, a bit is shifted into a quotient register into the appropriate bit position.

The division method shown in FIG. 9 is known as restoring division. In this type of division, there are repetitive subtractions of a divisor, first from a dividend and then from the partial result of the first and subsequent subtractions. If a subtraction result becomes negative, the original partial result (PR) before the subtraction is restored, the divisor is shifted down and another subtraction is tried.

In non-restoring division, operations continue even when the result is negative. However, the operations are additions instead of subtractions until the result becomes positive again (and then subtractions are done again, and so on). This can be shown by the relation:

$$-1 = -8 + 4 + 2 + 1$$

In the non-restoring method, 8 (the divisor) is subtracted and the process continues by adding 4,2 and 1 before the PR becomes positive again. When the PR becomes zero, the non-restoring division is finished. An example of this process is shown below.

| PR | 00001 | (1) |
|----|-------|-----|
|    | −01000 | (8) |
| PR | 11001 | (−7) |
|    | +00100 | (+4) |
| PR | 11101 | (−3) |
|    | +00010 | (+2) |
| PR | 11111 | (−1) |
|    | +00001 | (+1) |
| PR | 00000 |  |

FIG. 6 shows an embodiment of a divider using the adder of the present invention with a pipelined register stage for the carry compare. Thus, the divider's add-/subtract is performed in one cycle and a check occurs in the next. Because the check is late, the partial result (PR) is saved in a saved PR (SPR) register 75 for an additional cycle so that when a miscompare is detected, the appropriate PR is already saved.

The divider shown in FIG. 6 uses the non-restoring method although the restoring method could equally well be used.

To perform division, a divisor is loaded into a divisor register 77, while a dividend is loaded into a PR register 79. The first cycle is a subtract. The result of the subtract is shifted and placed into the PR register 79. The original PR (the value unadulterated by the add/subtract operation) is saved in the SPR 75 in case the carry predict adder miscompares.

The sign of the subtract determines whether an add or subtract is performed in the following cycle. If the result is negative then an add is done, else a subtract is done. A quotient bit is determined from the sign of the result, and is shifted into a quotient register's 85 least significant bit position.

In the following cycle, the add/subtract is performed as determined by the sign and the carries (the PC and the TC) of the previous cycle are checked. If they compare then everything is fine and the divide continues. If the PC and TC miscompare, then the result generated a cycle earlier is wrong. Thus, the division must be backed up to the point prior to the offending add/subtract by fetching the PR from the SPR 75 and "restoring" it back in the PR register 79. Also, the quotient bit may be wrong (i.e. the sign generated during the bad add/subtract may be incorrect) so the quotient bit is discarded also. It will be regenerated when the add-/subtract is redone.

The offending and/subtract operation is performed again, but this time the PCLA 81 is instructed to invert the carry. Note that the sign is saved for an additional cycle in SS register 83 so that when the divider is backed up to replay a bad add/subtract it is known whether it is an add or a sub which is to be reexecuted.

In terms of performance, the carry-predict adder will be wrong 1 in $2^9$ times per division iteration. For a 32-bit divide, the average divide will require $32/2^9$ restoration steps, or an additional 1/16 of a cycle, which is considered to be a negligible amount. That is, instead of taking 32 cycles for a 32 bit divide, it will take 32 and 1/16 cycles. However, the cycles themselves are shorter and thus the divide is faster.

The divider of the present invention always generates the true remainder and is fairly inexpensive in terms of the number of gates needed to implement the divider.

What is claimed is:

1. A high performance m-bit adder for adding or subtracting m-bit numbers to form an m-bit sum, comprising:
    a lower order n-bit adder, having n inputs to receive n lower order bits of two m-bit numbers, said lower order n-bit adder producing a lower order n-bit sum and a carry bit;
    a higher order p-bit adder having p inputs to receive p higher order bits of two m-bit numbers and a carry input to receive a predicted carry, said higher order p-bit adder adding the p higher order bits and a predicted carry to produce a higher order p-bit sum; and
    a predicted carry look ahead (PCLA) that has q inputs coupled to q of the n inputs of the lower order n-bit adder, and an output coupled to the carry input of the higher order p-bit adder, said PCLA providing at its output a predicted carry that is a prediction of a carry bit produced by the adding of the n lower order bits, said predicted carry being predicted in the PCLA as a function of only the q bits of the n lower order bits, wherein q is less than n.

2. The adder of claim 1, further comprising a compare unit that has two inputs and an output, one said input coupled to the lower order n-bit adder to receive the carry bit, and the other said input coupled to the output of the PCLA to receive the predicted carry, said compare unit comparing the predicted carry with the carry bit and providing a mis-prediction signal at the compare unit output when the predicted carry is not equal to the carry bit.

3. The adder of claim 2, further comprising correction logic having an input coupled to the compare unit output to receive the mis-prediction signal, said correction logic including means for correcting the m-bit sum when the correction logic receives the mis-prediction signal.

4. The adder of claim 3, wherein m is 32, n is 16, p is 16 and q is 8.

5. A high performance 32-bit adder for adding and subtracting 32-bit numbers to form a 32-bit sum, comprising:
    a first byte adder, having a carry input and eight inputs to receive the eight lowest order bits of 32-bit numbers, said first adder producing eight lowest order bits of the 32-bit sum and a first adder carry bit;
    a second byte adder, having a carry input and eight inputs to receive the eight second lowest order bits of the 32-bit numbers, said second byte adder producing eight second lowest order bits of the 32-bit sum and a second adder carry bit;
    a third byte adder, having a carry input and eight inputs to receive the eight third lowest order bits of the 32-bit numbers, said third byte adder producing the eight third lowest order bits of the 32-bit sum and a third adder carry bit;
    a fourth byte adder, having a carry input and eight inputs to receive the eight highest order bits of the 32-bit numbers, said fourth byte adder producing the eight highest order bits of the 32-bit sum and a fourth adder carry bit;

a first predicted carry look ahead (PCLA) that has eight inputs coupled to the eight inputs of the first byte adder and an output coupled to the carry input of the second byte adder, said PCLA providing at its output a first predicted carry that is a prediction of the first adder carry bit, said first predicted carry being predicted in the first PCLA as a function of only the eight lowest order bits;

a second PCLA that has eight inputs coupled to the eight inputs of the second byte adder, and an output coupled to the carry input of the third byte adder, said second PCLA providing at its output a second predicted carry that is a prediction of the second adder carry bit, said second predicted carry being predicted in the second PCLA as a function of only the eight second lowest order bits; and a third PCLA that has eight inputs coupled to the eight inputs of the third byte adder, and an output coupled to the carry input of the fourth byte adder, said third PCLA providing at its output a third predicted carry that is a prediction of the third adder carry bit, the third predicted carry being predicted in the third PCLA as a function of only the eight third lowest order bits.

6. The adder of claim 5, further comprising:

a first compare unit having two inputs and an output, with one input being coupled to the first byte adder to receive the first adder carry bit, and the other input coupled to the output of the first PCLA to receive the first predicted carry, said first compare unit comparing the first predicted carry with the first adder carry bit and providing a first mis-prediction signal at the first compare unit output when the first predicted carry is not equal to the first adder carry bit;

a second compare unit having two inputs and an output, with one input being coupled to the second byte adder to receive the second adder carry bit, and the other input coupled to the output of the second PCLA to receive the second predicted carry, said second compare unit comparing the second predicted carry with the second adder carry bit and providing a second mis-prediction signal at the second compare unit output when the second predicted carry is not equal to the second adder carry bit; and a third compare unit having two inputs and an output, with one input being coupled to the third byte adder to receive the third adder carry bit, and the other input coupled to the output of the third PCLA to receive the third predicted carry, said third compare unit comparing the third predicted carry with the third adder carry bit and providing a third mis-prediction signal at the third compare unit output when the third predicted carry is not equal to the third adder carry bit.

7. The adder of claim 6, further comprising replay/-correction logic having an input coupled to the first, second and third compare units to receive the first, second and third mis-prediction signals, said correction logic including means for correcting the 32-bit sum when the correction logic receives one of the first, second or third mis-prediction signals.

8. A method of operating an m-bit adder to add or subtract two m-bit numbers comprising:

inputing the two m-bit numbers into the m-bit adder, the m-bit adder including a lower order n-bit adder and a higher order p-bit adder;

partitioning each of the m-bit numbers into a lower order n-bit portion and a higher order p-bit portion;

providing a predicted carry-look-ahead device;

coupling the predicted carry-look-head device to q of the n bits of the lower order n-bit adder, wherein q is less than n;

operating the predicted carry-look-ahead device to produce a predicted carry for the addition of the lower order n-bit portions, said predicted carry being produced as a function of only the q bits of the lower order portions coupled to the predicted carry-look-ahead device;

adding together the lower order n-bit portions in the lower order n-bit adder to produce a lower order n-bit sum;

adding together the higher order p-bit portions of the m-bit numbers and the predicted carry to produce a higher order p-bit adder to produce a higher order sum;

calculating a true carry for the addition of the lower order n-bits in a carry look ahead (CLA);

comparing the predicted carry with the true carry in a compare unit and generating a mis-prediction signal when the predicted carry is not equal to the true carry;

combining the lower order and higher order sums into an m-bit sum; and correcting the m-bit sum when the mis-prediction signal is generated.

9. The method of claim 8, wherein the step of correcting the m-bit sum includes performing a ripple correction of the m-bit sum.

10. The method of claim 9, wherein the step of performing a ripple correction includes adding correcting vectors to the m-bit sum.

11. A high performance m-bit adder for adding or subtracting m-bit numbers to form an m-bit sum, comprising:

a lower order n-bit adder, having n inputs to receive n lower order bits of two m-bit numbers, said lower order n-bit adder producing a lower order n-bit sum;

a higher order p-bit adder having p inputs to receive p higher order bits of two m-bit numbers and a carry input to receive a predicted carry, said higher order p-bit adder adding the p higher order bits and a predicted carry to produce a higher order p-bit sum;

a carry look ahead (CLA) coupled to the lower order n-bit adder and the higher order p-bit adder, the CLA receiving r bits of the two m-bit numbers and producing true carry bits; and a predicted carry look ahead (PCLA) that has q inputs coupled to q of the n inputs of the lower order n-bit adder, and an output coupled to the carry input of the higher order p-bit adder, said PCLA providing at its output a predicted carry that is a prediction of a true carry bit produced by the CLA, said predicted carry being predicted in the PCLA as a function of only the q bits of the n lower order bits, wherein q is less than n.

12. The adder of claim 11, further comprising a compare unit that has two inputs and an output, one said input coupled to the CLA to receive the true carry bit, and the other said input coupled to the output of the PCLA to receive the predicted carry, said compare unit comparing the predicted carry with the true carry bit and providing a mis-prediction signal at the compare unit output when the predicted carry is not equal to the true carry bit.

13. The adder of claim 12, further comprising correction logic having an input coupled to the compare unit output to receive the mis-prediction signal, said correction logic including means for correcting the m-bit sum when the correction logic receives the mis-prediction signal.

14. The adder of claim 13, wherein m is 32, n is 16, p is 16 and q is 8.

15. A high performance 32-bit adder for adding and subtracting 32-bit numbers to form a 32-bit sum, comprising:
   a first byte adder, having a carry input and eight inputs to receive the eight lowest order bits of 32-bit numbers, said first adder producing eight lowest order bits of the 32-bit sum;
   a second byte adder, having a carry input and eight inputs to receive the eight second lowest order bits of the 32-bit numbers, said second byte adder producing eight second lowest order bits of the 32-bit sum;
   a third byte adder, having a carry input and eight inputs to receive the eight third lowest order bits of the 32-bit numbers, said third byte adder producing the eight third lowest order bits of the 32-bit sum;
   a fourth byte adder, having a carry input and eight inputs to receive the eight highest order bits of the 32-bit numbers, said fourth byte adder producing the eight highest order bits of the 32-bit sum;
   a carry look ahead (CLA) coupled to the byte adders and which receives the twenty-four lowest order bits of the 32-bit numbers and produces: a first true carry bit for the eight lowest order bits, a second true carry bit for the eight second lowest order bits, and a third true carry bit for the eight third lowest order bits;
   a first predicted carry look ahead (PCLA) that has eight inputs coupled to the eight inputs of the first byte adder and an output coupled to the carry input of the second byte adder, said PCLA providing at its output a first predicted carry that is a prediction of the first true carry bit, said first predicted carry being predicted in the first PCLA as a function of only the eight lowest order bits;
   a second PCLA that has eight inputs coupled to the eight inputs of the second byte adder, and an output coupled to the carry input of the third byte adder, said second PCLA providing at its output a second predicted carry that is a prediction of the second true carry bit, said second predicted carry being predicted in the second PCLA as a function of only the eight second lowest order bits; and
   a third PCLA that has eight inputs coupled to the eight inputs of the third byte adder, and an output coupled to the carry input of the fourth byte adder, said third PCLA providing at its output a third predicted carry that is a prediction of the third true carry bit, the third predicted carry being predicted in the third PCLA as a function of only the eight third lowest order bits.

16. The adder of claim 15, further comprising:
   a first compare unit having two inputs and an output, with one input being coupled to the CLA to receive the first true carry bit, and the other input coupled to the output of the first PCLA to receive the first predicted carry, said first compare unit comparing the first predicted carry with the first true carry bit and providing a first mis-prediction signal at the first compare unit output when the first predicted carry is not equal to the first true carry bit;
   a second compare unit having two inputs and an output, with one input being coupled to the CLA to receive the second true carry bit, and the other input coupled to the output of the second PCLA to receive the second predicted carry, said second compare unit comparing the second predicted carry with the second true carry bit and providing a second mis-prediction signal at the second compare unit output when the second predicted carry is not equal to the second true carry bit; and
   a third compare unit having two inputs and an output, with one input being coupled to the to receive the third true carry bit, and the other input coupled to the output of the third PCLA to receive the third predicted carry, said third compare unit comparing the third predicted carry with the third true carry bit and providing a third mis-prediction signal at the third compare unit output when the third predicted carry is not equal to the third true carry bit.

17. The adder of claim 16, further comprising correction logic having an input coupled to the first, second and third compare units to receive the first, second and third mis-prediction signals, said correction logic including means for correcting the 32-bit sum when the correction logic receives one of the first, second or third mis-prediction signals.

18. The adder of claim 15, wherein each PCLA includes parallel logic paths with one path providing a predicted carry for addition and the other path providing a predicted carry for subtraction.

19. A method of operating an m-bit adder to add or subtract two m-bit numbers comprising:
   inputing the two m-bit numbers into the m-bit adder, the m-bit adder including a lower order n-bit adder and a higher order adder;
   partitioning each of the m-bit numbers into a lower order portion and a higher order portion;
   providing a predicted carry-look-ahead device;
   coupling the predicted carry-look-head device to q of the total number of bits of the lower order adder, wherein q is less than the total number of bits of the lower order adder;
   operating the predicted carry-look-ahead device to produce a predicted carry for the lower order portions, said predicted carry being produced as a function of only the q bits of the lower order portions;
   adding the lower order portions in the lower order adder to produce a lower order sum;
   adding the higher order portions and the predicted carry in the higher order adder to produce a higher order sum;
   producing a true carry in carry look ahead logic for the addition of the lower order portions of the two m-bit numbers;
   comparing the predicted carry with the true carry in a compare unit and generating a mis-prediction signal when the predicted carry is not equal to the true carry;
   combining the lower order and higher order sums into an m-bit sum; and correcting the m-bit sum when the mis-prediction signal is generated.

20. A high performance divider for dividing m-bit numbers, comprising:
- a divisor register which stores an m-bit divisor;
- a partial result register which stores a partial result of a division;
- a lower order n-bit adder coupled to the divisor register and the partial result register, having inputs to receive n lower order bits of the divisor and the partial result, said lower order n-bit adder producing n lower order bits of a new partial result and a true carry bit;
- a higher order p-bit adder coupled to the divisor register and the partial result register, having inputs to receive p higher order bits of the divisor and the partial result, said higher order p-bit adder producing p higher order bits of a new partial result, said lower and higher order bits of the new partial result replacing the partial result stored in the partial result register after performance of an addition or subtraction by said lower order n-bit adder and said higher order p-bit adder;
- a predicted carry look ahead (PCLA) that has inputs coupled to q of the inputs of the lower order n-bit adder, and an output coupled to a carry input of the higher order p-bit adder, said PCLA providing at its output a predicted carry that is a prediction of the true carry bit, said predicted carry being predicted in the PCLA as a function of only the q bits of the n lower order bits;
- a comparison unit coupled to the PCLA and the lower order n-bit adder to receive the predicted carry and the true carry bit and produce a mis-comparison signal when the predicted carry and the true carry bit do not match; and
- replay logic coupled to the comparison unit which corrects the predicted carry and causes a replay of an addition or subtraction cycle using the corrected predicted carry when the mis-comparison signal is produced by the comparison unit.

* * * * *